(12) United States Patent
Hashimoto et al.

(10) Patent No.: US 8,210,301 B2
(45) Date of Patent: Jul. 3, 2012

(54) BATTERY MOUNTING STRUCTURE FOR VEHICLE

(75) Inventors: Takashi Hashimoto, Tokyo (JP); Toshiyuki Yamamoto, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 159 days.

(21) Appl. No.: 12/793,975

(22) Filed: Jun. 4, 2010

(65) Prior Publication Data

US 2010/0307848 A1   Dec. 9, 2010

(30) Foreign Application Priority Data

Jun. 9, 2009  (JP) ................................. 2009-138064

(51) Int. Cl.
  *B60R 16/04* (2006.01)
(52) U.S. Cl. ..................................................... 180/68.5
(58) Field of Classification Search .................. 180/54.1, 180/65.1, 65.22, 68.5, 69.1, 69.4; 280/834; 429/96, 100
  See application file for complete search history.

(56) References Cited

U.S. PATENT DOCUMENTS

| | | | | |
|---|---|---|---|---|
| 2,933,548 A * | 4/1960 | Walker | ............................ | 429/100 |
| 3,741,815 A * | 6/1973 | Peterson | ........................ | 429/176 |
| 4,444,373 A * | 4/1984 | Hayashi | ........................ | 248/544 |
| 4,453,724 A * | 6/1984 | Watanabe et al. | ............. | 280/834 |
| 4,621,822 A * | 11/1986 | Knochelmann et al. | ...... | 280/834 |
| 4,765,635 A * | 8/1988 | Okada | ........................... | 280/834 |
| 4,789,224 A * | 12/1988 | Bougsty | ......................... | 349/65 |
| 5,097,789 A * | 3/1992 | Oka | ................................ | 114/363 |
| 5,280,273 A * | 1/1994 | Goldstein | ...................... | 340/632 |
| 5,326,651 A * | 7/1994 | Mehta et al. | ..................... | 429/96 |
| 5,392,873 A * | 2/1995 | Masuyama et al. | .......... | 180/68.5 |
| 5,405,167 A * | 4/1995 | Lee | ................................ | 280/830 |
| 5,501,289 A * | 3/1996 | Nishikawa et al. | .......... | 180/68.5 |
| 5,534,364 A * | 7/1996 | Watanabe et al. | .............. | 429/61 |
| 5,555,950 A * | 9/1996 | Harada et al. | ................. | 180/65.1 |
| 5,579,697 A * | 12/1996 | Burke | .......................... | 105/355 |
| 5,584,526 A * | 12/1996 | Soldner | .................... | 296/146.15 |
| 5,585,205 A * | 12/1996 | Kohchi | ........................... | 429/99 |
| 5,620,057 A * | 4/1997 | Klemen et al. | .............. | 180/68.5 |
| 5,863,674 A * | 1/1999 | Yamanaka | .................... | 429/100 |
| 5,948,298 A * | 9/1999 | Ijaz | ................................ | 219/209 |
| 5,997,040 A * | 12/1999 | Fukagawa et al. | ............. | 280/834 |
| 6,040,080 A * | 3/2000 | Minami et al. | ................. | 429/96 |
| 6,188,574 B1 * | 2/2001 | Anazawa | ....................... | 361/695 |
| 6,218,041 B1 * | 4/2001 | Barbier et al. | .................. | 429/96 |

(Continued)

FOREIGN PATENT DOCUMENTS

JP    2006-335243 A    12/2006

(Continued)

*Primary Examiner* — John R Olszewski
*Assistant Examiner* — Brodie Follman
(74) *Attorney, Agent, or Firm* — McDermott Will & Emery LLP; Louis J. DelJuidice, Esq.; Hiroyuki Yasuda

(57) ABSTRACT

In a battery mounting structure for a vehicle that includes a battery box mounted on an under-floor side of a vehicle body floor, the battery box includes: a battery pan on which a battery is placed; an outer peripheral frame formed to project from an outer peripheral edge portion of the battery pan; a cover placed on the battery pan from above; and sealing means provided in a joint portion between the battery pan and the cover, wherein the sealing means is disposed above the outer peripheral frame and positioned further inside than an outer periphery of the outer peripheral frame in plan view.

8 Claims, 11 Drawing Sheets

U.S. PATENT DOCUMENTS

| | | | | |
|---|---|---|---|---|
| 6,224,998 B1* | 5/2001 | Brouns et al. | | 429/100 |
| 6,227,322 B1* | 5/2001 | Nishikawa | | 180/68.5 |
| 6,435,365 B2* | 8/2002 | Pachciarz et al. | | 220/4.14 |
| 6,511,770 B2* | 1/2003 | Chang | | 429/100 |
| 6,617,973 B1* | 9/2003 | Osterman | | 340/636.1 |
| 6,723,466 B2* | 4/2004 | Oogami et al. | | 429/94 |
| 6,886,861 B2* | 5/2005 | Marsala et al. | | 280/834 |
| 7,040,432 B2* | 5/2006 | Kawasaki et al. | | 180/65.1 |
| 7,040,691 B1* | 5/2006 | Jacobs et al. | | 296/193.07 |
| 7,051,825 B2* | 5/2006 | Masui et al. | | 180/68.5 |
| 7,350,610 B2* | 4/2008 | Kikuchi | | 180/68.5 |
| 7,401,669 B2* | 7/2008 | Fujii et al. | | 180/68.5 |
| 7,544,439 B2* | 6/2009 | Diehl et al. | | 429/54 |
| 7,610,783 B2* | 11/2009 | Rudduck et al. | | 70/277 |
| 7,610,978 B2* | 11/2009 | Takasaki et al. | | 180/68.5 |
| 7,614,473 B2* | 11/2009 | Ono et al. | | 180/299 |
| 7,631,712 B2* | 12/2009 | Watanabe | | 180/68.5 |
| 7,654,351 B2* | 2/2010 | Koike et al. | | 180/68.5 |
| 7,654,352 B2* | 2/2010 | Takasaki et al. | | 180/68.5 |
| 7,688,582 B2* | 3/2010 | Fukazu et al. | | 361/690 |
| 7,690,686 B2* | 4/2010 | Hashimura et al. | | 280/782 |
| 7,726,427 B2* | 6/2010 | Picavet | | 180/68.5 |
| 7,913,788 B1* | 3/2011 | Bryer et al. | | 180/68.5 |
| 7,926,602 B2* | 4/2011 | Takasaki | | 180/68.5 |
| 7,931,105 B2* | 4/2011 | Sato et al. | | 180/68.5 |
| 7,993,155 B2* | 8/2011 | Heichal et al. | | 439/374 |
| 7,997,368 B2* | 8/2011 | Takasaki et al. | | 180/68.5 |
| 8,006,793 B2* | 8/2011 | Heichal et al. | | 180/68.5 |
| 8,079,435 B2* | 12/2011 | Takasaki et al. | | 180/68.5 |
| 2004/0035617 A1* | 2/2004 | Chaney | | 180/65.1 |
| 2004/0056472 A1* | 3/2004 | Schneider | | 280/834 |
| 2006/0119137 A1* | 6/2006 | Coakley | | 296/187.03 |
| 2007/0024947 A1* | 2/2007 | Tonar et al. | | 359/265 |
| 2007/0040418 A1* | 2/2007 | Ohkuma et al. | | 297/15 |
| 2007/0284167 A1* | 12/2007 | Watanabe et al. | | 180/68.5 |
| 2008/0151350 A1* | 6/2008 | Tonar et al. | | 359/267 |
| 2008/0160394 A1* | 7/2008 | Takasaki et al. | | 429/96 |
| 2008/0160396 A1* | 7/2008 | Nishino | | 429/100 |
| 2008/0182163 A1* | 7/2008 | Xiao et al. | | 429/100 |
| 2008/0190679 A1* | 8/2008 | Sato et al. | | 180/68.5 |
| 2008/0196957 A1* | 8/2008 | Koike et al. | | 180/68.5 |
| 2009/0026802 A1* | 1/2009 | Imada et al. | | 296/187.11 |
| 2009/0044997 A1* | 2/2009 | Picavet | | 180/68.5 |
| 2009/0090575 A1* | 4/2009 | Nagasaka | | 180/68.5 |
| 2009/0120703 A1* | 5/2009 | Nagata | | 180/68.5 |
| 2009/0152034 A1* | 6/2009 | Takasaki et al. | | 180/68.5 |
| 2009/0166116 A1* | 7/2009 | Kiya et al. | | 180/68.5 |
| 2009/0186266 A1* | 7/2009 | Nishino et al. | | 429/120 |
| 2009/0226806 A1* | 9/2009 | Kiya | | 429/186 |
| 2009/0236161 A1* | 9/2009 | Meier et al. | | 180/68.5 |
| 2009/0236162 A1* | 9/2009 | Takasaki et al. | | 180/68.5 |
| 2009/0242299 A1* | 10/2009 | Takasaki et al. | | 180/68.5 |
| 2009/0298311 A1* | 12/2009 | Nakanishi et al. | | 439/76.2 |
| 2010/0000816 A1* | 1/2010 | Okada | | 180/68.5 |
| 2010/0025126 A1* | 2/2010 | Nakatsu et al. | | 180/65.1 |
| 2010/0059208 A1* | 3/2010 | Nakamura | | 165/104.34 |
| 2010/0071979 A1* | 3/2010 | Heichal et al. | | 180/68.5 |
| 2010/0273040 A1* | 10/2010 | Kubota et al. | | 429/100 |
| 2010/0321758 A1* | 12/2010 | Bugno et al. | | 359/267 |
| 2011/0000729 A1* | 1/2011 | Schwarz et al. | | 180/68.5 |
| 2011/0011654 A1* | 1/2011 | Kubota et al. | | 180/65.21 |
| 2011/0024207 A1* | 2/2011 | Higashino et al. | | 180/65.1 |
| 2011/0139527 A1* | 6/2011 | Bannier et al. | | 180/68.5 |
| 2011/0262780 A1* | 10/2011 | Cohen | | 429/49 |
| 2011/0262801 A1* | 10/2011 | Schwab | | 429/163 |
| 2011/0297469 A1* | 12/2011 | Usami et al. | | 180/68.5 |

FOREIGN PATENT DOCUMENTS

JP        2009-035126 A        2/2009

* cited by examiner

FIG. 11
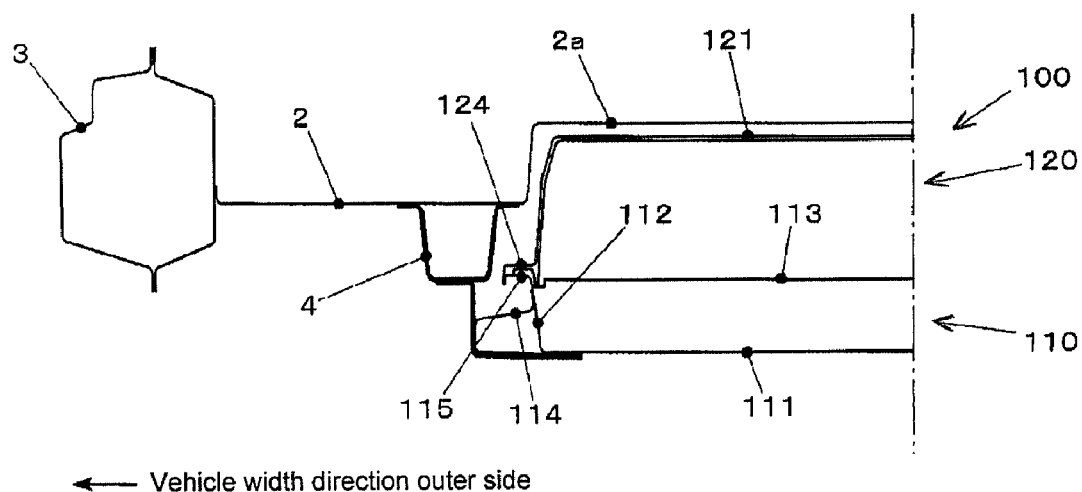
← Vehicle width direction outer side
FIG. 11A
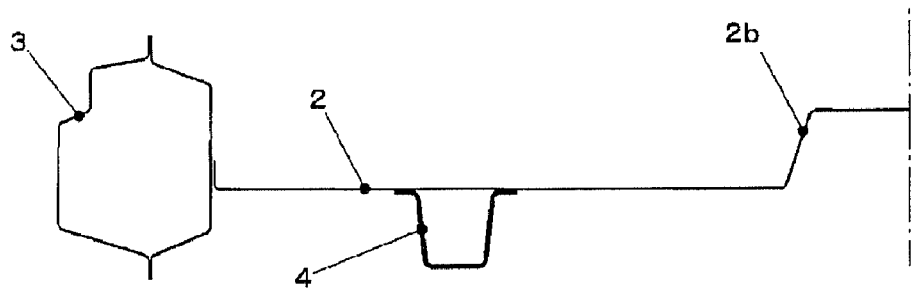
← Vehicle width direction outer side
FIG. 11B

BATTERY MOUNTING STRUCTURE FOR VEHICLE

CROSS-REFERENCE TO RELATED APPLICATIONS

The present application claims priority from Japanese Patent Application No. 2009-138064 filed on Jun. 9, 2009, and is hereby incorporated by reference in its entirety.

BACKGROUND OF THE INVENTION

1. Field of the Invention

The present invention relates to battery mounting structures for vehicles, with which a battery can be mounted in a vehicle such as an electric vehicle or an electric hybrid vehicle.

2. Description of the Related Art

In a vehicle such as an electric vehicle or an engine/electric hybrid vehicle, a battery used as a travel power source is conventionally mounted in the vehicle, housed in a battery box serving as a protective container.

For example, Japanese Unexamined Patent Application Publication No. 2006-335243 describes a power supply device for a vehicle in which a battery box that includes a battery cover and houses a plurality of battery modules is connected to a side frame of a vehicle body via a support frame extending in a left-right direction.

Further, to ensure that a center of gravity of the vehicle is low and secure sufficient space in a cabin, the battery box is preferably mounted in an under-floor portion. In this case, however, measures must be taken to ensure that the battery is not drenched with water churned up by a vehicle wheel, water sprayed by a high-pressure car-washing machine during car washing, and so on.

For example, Japanese Unexamined Patent Application Publication No. 2009-35126 describes a battery box structure having vertically separated housing spaces, in which a battery that is vulnerable to drenching is housed in an upper housing space and accessories are housed in a lower housing space.

The structure described in Japanese Unexamined Patent Application Publication No. 2009-35126 is designed to be mounted on a frame side of a hybrid electric truck, and since the battery is disposed on the upper side, the center of gravity of the vehicle is high. Moreover, the height of the battery box is increased, and it is therefore difficult to secure cabin space. Hence, the structure cannot easily be disposed in an under-floor portion of a passenger car, for example.

SUMMARY OF THE INVENTION

An object of the present invention is to provide a battery mounting structure for a vehicle with which a battery is unlikely to be drenched even when the structure is disposed under a floor.

The present invention achieves the object described above using the following means.

A first aspect of the present invention is a battery mounting structure for a vehicle, which includes a battery box that is mounted on an under-floor side of a vehicle body floor, wherein the battery box includes: a battery pan on which a battery is placed; an outer peripheral frame formed to project from an outer peripheral edge portion of the battery pan; a cover placed on the battery pan from above; and sealing means provided in a joint portion between the battery pan and the cover, the sealing means being disposed above the outer peripheral frame and positioned further inside than an outer periphery of the outer peripheral frame in plan view.

A second aspect of the present invention is the battery mounting structure for a vehicle according to the first aspect, wherein a guard portion for concealing the sealing means from the outside of a vehicle in cooperation with the outer peripheral frame is formed on an outer peripheral edge portion of at least one of the cover and the battery pan.

A third aspect of the present invention is the battery mounting structure for a vehicle according to the first or second aspect, wherein the sealing means in a front end portion of the battery box is disposed on a rear side of a cross member that is provided on the vehicle body so as to extend in the vehicle width direction, and a part of the outer peripheral frame is disposed under a gap between the cross member and the sealing means.

A forth aspect of the present invention is the battery mounting structure for a vehicle according to the third aspect, including a stay for connecting the front end portion of the battery box to the cross member.

A fifth aspect of the present invention is the battery mounting structure for a vehicle according to any one of the first to fourth aspects, wherein the sealing means includes: a seal member formed from an elastic material; and a battery pan side flange and a cover side flange opposing each other across the seal member; a clamp that sandwiches the battery pan side flange and the cover side flange using a spring force; and a dropping-off prevention plate which is provided between an upper surface of the cover side flange and the clamp, and which engages with the cover side flange and the clamp to prevent the clamp from dropping off.

According to the present invention, the following effects can be obtained.

(1) Since the sealing means is disposed above the outer peripheral frame and positioned further inside than the outer periphery of the outer peripheral frame in plan view, the outer peripheral frame protects the sealing means such that even when a lower portion of the vehicle body is sprayed with water from a vehicle wheel or a high-pressure car-washing machine, the water is unlikely to reach the sealing means. As a result, drenching of the battery can be prevented even when the battery box is mounted under the floor.

(2) Since the guard portion for concealing the sealing means from the outside of the vehicle in cooperation with the outer peripheral frame is formed on the outer peripheral edge portion of at least one of the cover and the battery pan, the sealing means can be protected against water that passes through the outer peripheral frame. As a result, drenching of the battery can be prevented more reliably. A tongue-shaped end surface portion extending downward from a projecting end portion of the cover side flange, for example, may be used as the guard portion.

(3) Since the sealing means in the front end portion of the battery box is disposed on the rear side of the cross member provided on the vehicle body so as to extend in the vehicle width direction, and a part of the outer peripheral frame is disposed under the gap between the cross member and the sealing means, the sealing means in the front portion of the battery box, which is more likely to be soaked with water during travel, can be protected by the cross member and the outer peripheral frame, thereby preventing drenching of the battery. Further, by providing the cross member, load transfer in the vehicle width direction can be performed efficiently and rigidity can be secured in the vehicle body even when a large recessed portion for housing the battery is formed in the floor panel.

(4) By providing the stay for connecting the front end portion of the battery box to the cross member, support rigidity in the front end portion of the battery box can be improved, and the sealing means can be protected by the stay such that water is prevented from reaching the sealing means.

(5) By providing the sealing means having the seal member formed from an elastic material, the battery pan side flange and cover side flange opposing each other across the seal member, and the clamp that sandwiches the battery pan side flange and the cover side flange using a spring force, as well as the dropping-off prevention plate provided between the upper surface of the cover side flange and the clamp, which engages respectively with the cover side flange and the clamp to prevent the clamp from dropping off, a projection width of the flanges can be reduced in comparison with, for example, a technique in which an outer peripheral side of the seal member is fastened using a bolt or the like, and therefore, in a case, for example, where the battery box is housed in a limited space portion between the left and right side frames or the like, the width of the flanges can be narrowed, enabling an increase in the volume of the battery box main body. Further, by sandwiching the flanges using the clamp, a process for assembling the battery box can be simplified in comparison with a case in which the fastening is performed using a bolt or the like. Moreover, by providing the dropping-off prevention plate that engages with the upper surface of the cover side flange and the clamp, the clamp can be prevented from becoming dislodged while the vehicle is in use, and as a result, reliability can be secured.

BRIEF DESCRIPTION OF THE DRAWINGS

FIG. 11A and FIG. 11B are views showing a difference in floor structure between the vehicle according to this embodiment and an engine vehicle that is a base vehicle of the vehicle according to this embodiment.

DESCRIPTION OF THE PREFERRED EMBODIMENTS

Figure 1:
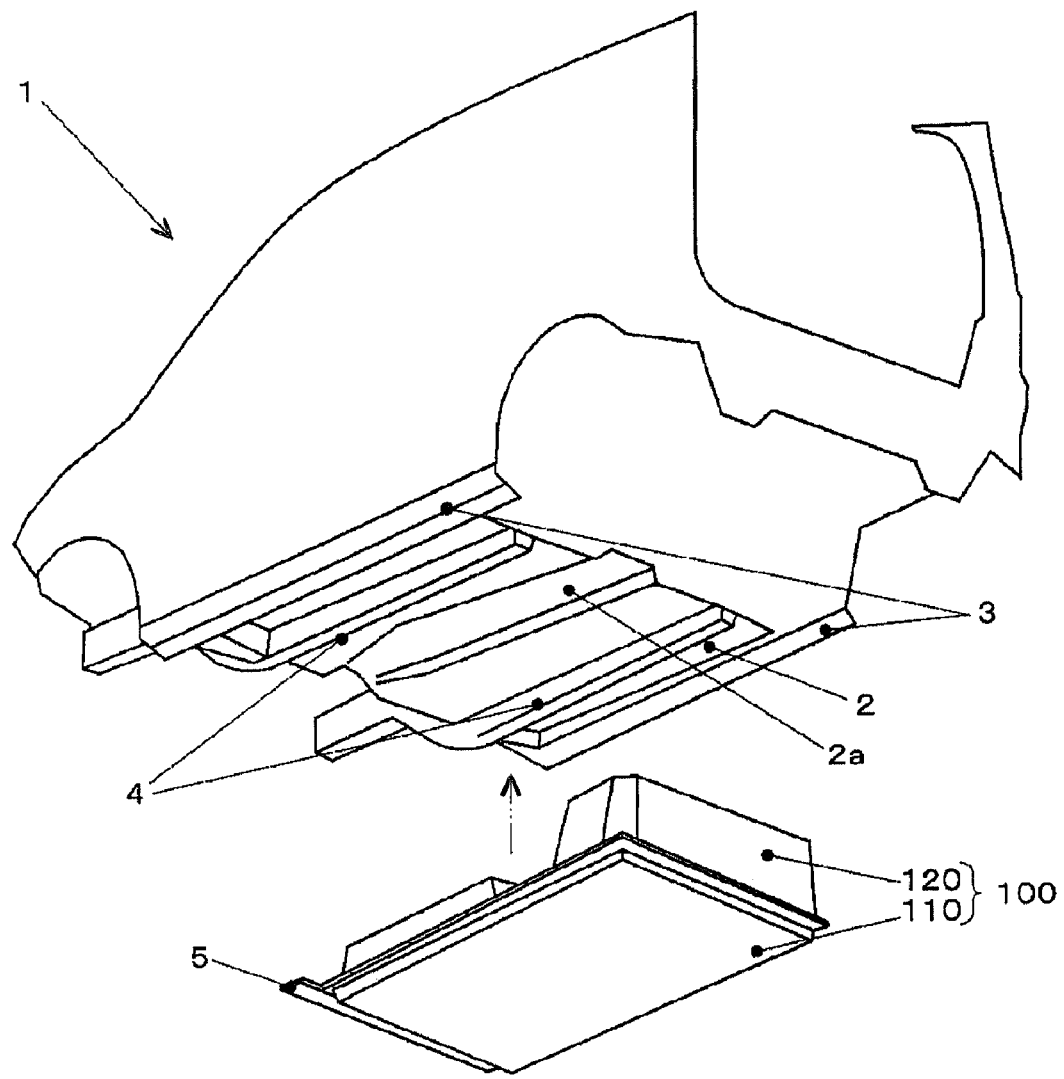
FIG. 1 is an external perspective view from a diagonal lower side and a diagonal rear side of a vehicle body and a battery box included in an embodiment of a battery mounting structure for a vehicle to which the present invention is applied.

The present invention achieves the object of providing a battery mounting structure for a vehicle with which a battery is unlikely to be drenched even when the structure is disposed under a floor by having an outer peripheral frame project downward below a sealing portion formed between a battery pan and a cover constituting a battery box.

An embodiment of a battery mounting structure for a vehicle to which the present invention is applied will be described below. The battery mounting structure for a vehicle according to this embodiment is provided in a cabin underfloor portion of a vehicle such as a passenger car, for example.

A vehicle 1 on which the battery mounting structure for a vehicle is mounted is a two-box type small passenger vehicle (a minivan), for example, and includes a floor panel 2, side sills 3, side frames 4, a cross member 5, and so on, wherein a battery box 100 is mounted in a suspended state on an underfloor side of the floor panel 2 and in a gap between the left and right side frames 4.

The floor panel 2 is a surface portion constituting a cabin floor surface. The floor panel 2 is formed by pressing a steel plate, for example, and forms a part of a monocoque structure of the body of the vehicle 1.

The side sills 3 are provided on left and right end portions of the floor panel 2 as structural members having a closed cross section that extends substantially along a front-rear direction of the vehicle.

The side frames 4 are structural members having a closed cross section that extends along a lower surface of the floor panel 2 in the front-rear direction of the vehicle. The side frames 4 are disposed further inside in a vehicle width direction than the side sills 3, and are provided in a left-right symmetrical pair.

Figure 3:
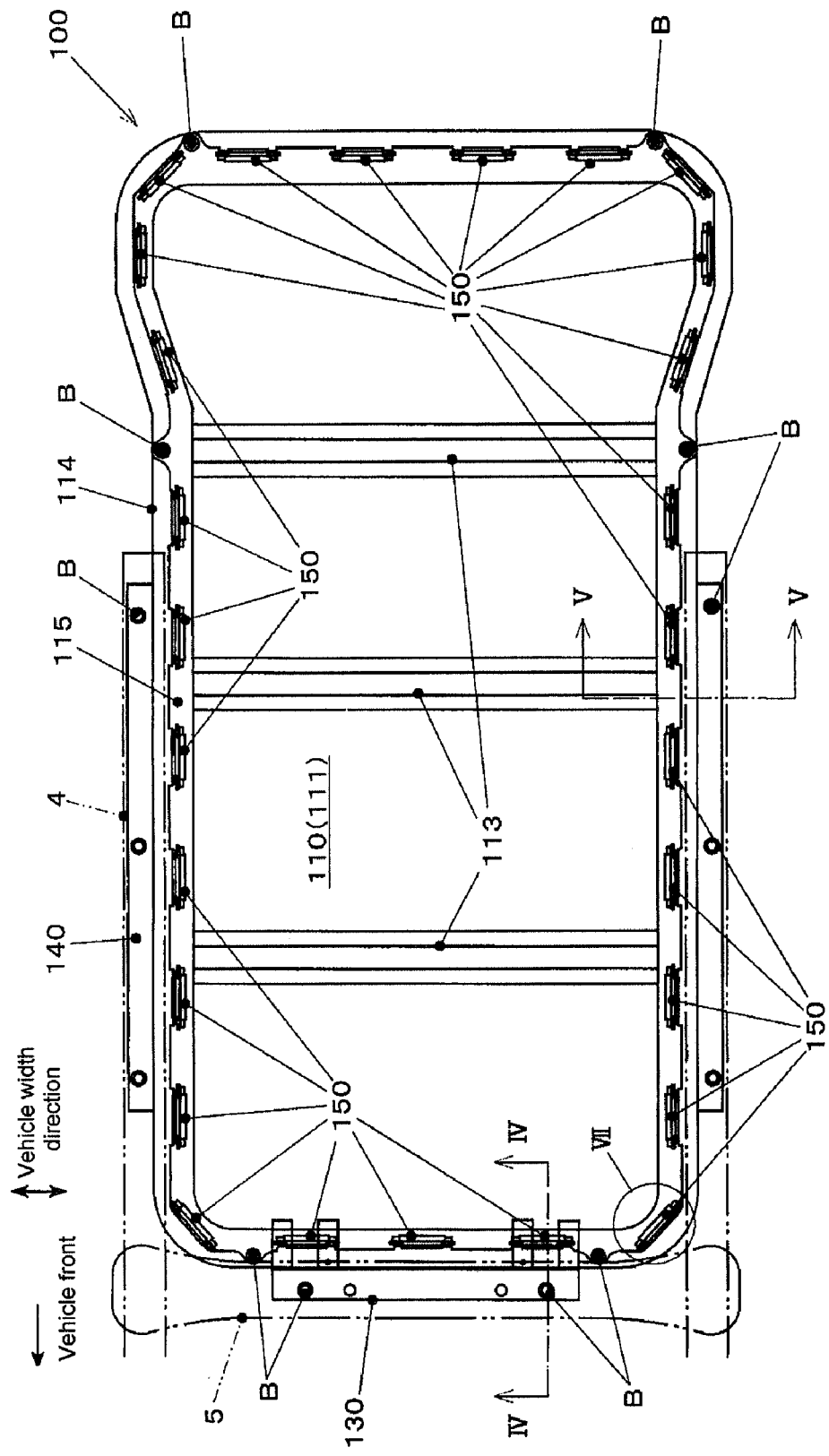
FIG. 3 is a plan view seen from above of the battery mounting structure for a vehicle according to this embodiment, the cover of which is not shown.

As shown in FIG. 3, respective rear end portions of the side frames 4 are disposed adjacent to a front-rear direction central portion of the battery box 100.

As shown in FIG. 11A, an area of the floor panel 2 between the left and right side frames 4 projects upward over substantially its entire width, thereby forming a battery housing portion 2a in which an upper portion of the battery box 100 is housed.

As shown in FIG. 3, the cross member 5 is a transverse-beam shaped member provided across the left and right side frames 4 on the front side of the battery box 100.

Figure 4:
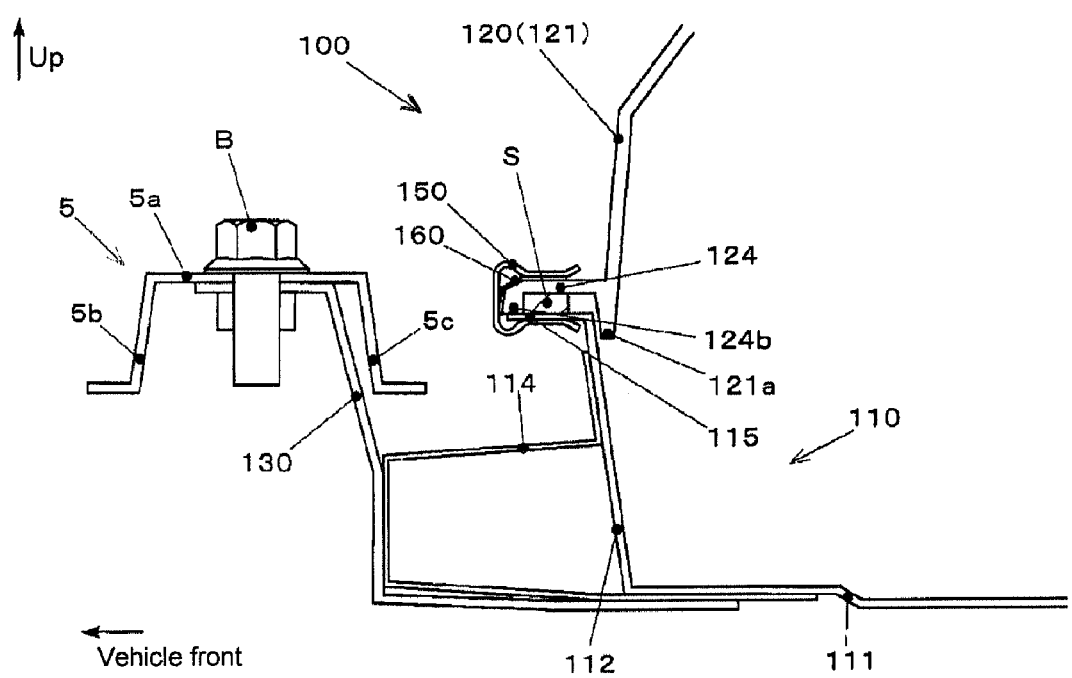
FIG. 4 is a sectional view of the battery mounting structure for a vehicle according to this embodiment, taken along an arrow IV-IV in FIG. 3.

As shown in FIG. 4, a transverse sectional shape of the cross member 5 includes a front surface portion 5b and a rear surface portion 5c extending respectively downward from front and rear end portions of a strip-shaped upper surface portion 5a. The cross member 5 is formed integrally by pressing a steel plate, for example.

The battery box 100 is mounted on the under-floor side of the floor panel 2 of the vehicle 1 while housing a battery, not shown in the drawings.

Figure 2:
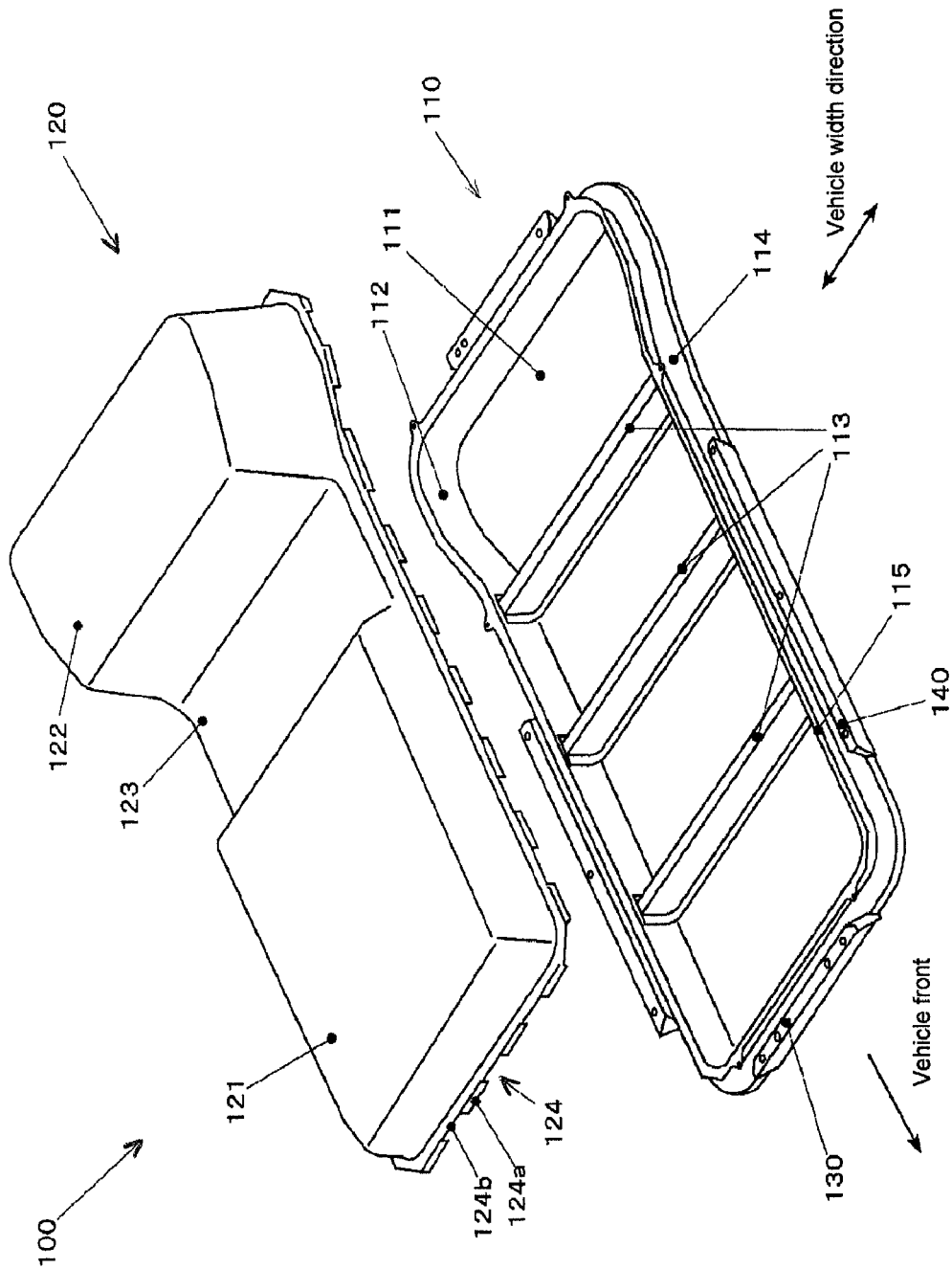
FIG. 2 is an exploded perspective view from a diagonal upper side and a diagonal front side of the battery box provided in the battery mounting structure for a vehicle according to the embodiment.

As shown in FIG. 2, the battery box 100 is constituted by a plate-shaped battery pan 110 for carrying the battery and a cover 120 placed on an upper portion of the battery pan 110.

The battery pan 110 is constituted by a floor surface portion 111, a wall portion 112, a cross member 113, an outer peripheral frame 114, a flange 115, and so on. These members are respectively formed by, for example, pressing a steel plate and joined by welding or the like. Further, the floor surface portion 111, wall portion 112 and flange 115 are formed integrally.

The floor surface portion 111 is a flat plate-shaped part on which the battery is placed. When seen from the top of the vehicle, the floor surface portion 111 has a substantially rectangular planar shape with a long side direction that corresponds to the vehicle front-rear direction. A plurality of beads extending in the vehicle front-rear direction are formed on the floor surface portion 111 for reinforcement.

The wall portion 112 is a part that stands upright from an outer peripheral edge portion of the floor surface portion 111. The wall portion 112 constitutes a front surface portion, a rear surface portion and a side surface portion of a lower portion of the battery box 100.

As shown in FIGS. 2, 3 and so on, the cross member 113 is a transverse-beam shaped member provided in the interior of the battery pan 110 to connect the left and right side surface portions. The cross member 113 is joined to both the floor surface portion 111 and the wall portion 112 by welding or the like.

The outer peripheral frame 114 is a structural member provided around the entire periphery of the outer peripheral edge portion of the battery pan 110 and formed to project outward in a horizontal direction from a lower portion of the wall portion 112. The outer peripheral frame 114 secures rigidity in the battery box 100 and also serves to prevent water from entering a joint portion between the battery pan 110 and the cover 120. This will be described in detail below.

The flange 115 projects outward in the horizontal direction from an upper end portion of the wall portion 112 and serves as the joint portion for joining the battery pan 110 to the cover 120.

The cover 120 is placed on the upper portion of the battery pan 110, and is formed integrally from a resin-based material, for example.

The cover 120 is constituted by a front housing portion 121, a rear housing portion 122, a connecting portion 123, a flange 124, and so on.

The front housing portion 121 and rear housing portion 122 are box-shaped parts formed to project upward so that the battery can be housed in the interior thereof.

Figure 6:
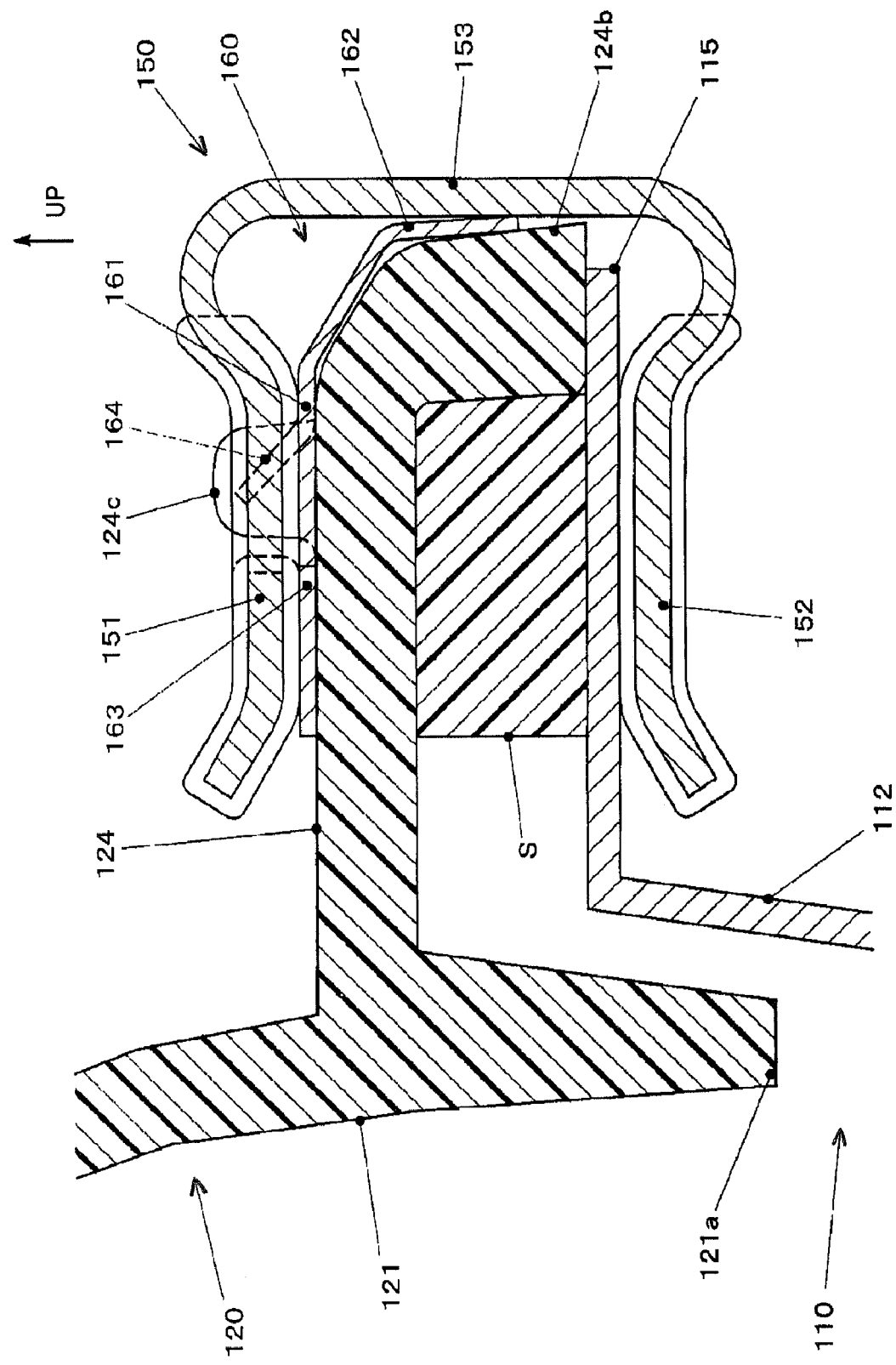
FIG. 6 is a sectional view from a horizontal direction of a fastening location between a battery pan and a cover of the battery box according to this embodiment.

As shown in FIG. 6, a lower end portion 121a of a side wall of the front housing portion 121 included in the cover 120 is disposed in a lower position than the flange 115 of the battery pan 110.

The connecting portion 123 connects the front housing portion 121 to the rear housing portion 122, and the battery box 100 is reduced in height at this portion so that the height of this portion does not cause interference with other components.

The flange 124 is formed to project outward in the horizontal direction from an outer peripheral edge portion in the vicinity of a lower end portion of the cover 120, and is disposed opposite the aforesaid flange 115 of the battery pan 110. Further, a seal member S formed from a rubber-based material or the like having elasticity, for example, is sandwiched between the flange 115 and the flange 124. The seal member S is crushed between the flanges 115 and 124 so that a gap between the flanges 115 and 124 is tightly closed, and as a result, water is prevented from entering the interior of the battery box 100 through this part. The entire periphery of the seal member S is disposed further inside than an outer periphery (projecting end portion) of the outer peripheral frame 114 in plan view when the battery box 100 is seen from above.

The flange 115 and the flange 124 are fastened using a clamp 150 and a plate 160, and as shown in FIG. 3, supplemental bolts B are used in locations where interference does not occur with vehicle body side members such as the side frames 4. A fastening operation using the clamp 150 and the plate 160 will be described in detail below.

Figure 7:
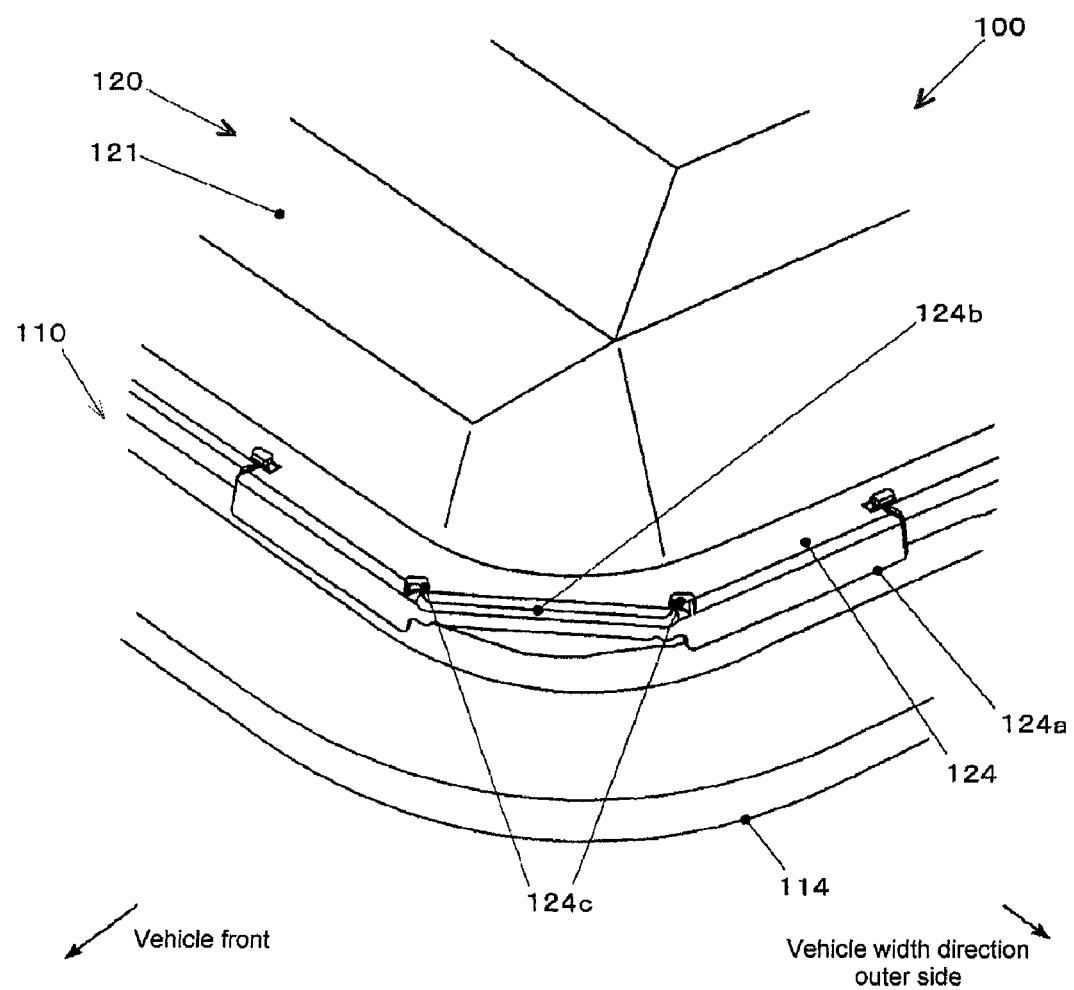
FIG. 7 is a perspective view of the fastening location between the battery pan and the cover of the battery box according to this embodiment (a VII portion in FIG. 3) before attached with a clamp and a plate.

As shown in FIG. 7 and so on, the flange 124 is formed with end surface portions 124a and 124b and projections 124c.

The end surface portions 124a and 124b are tongue-shaped parts formed to project downward from an outer peripheral edge portion (projecting end portion) of the flange 124.

Figure 10:
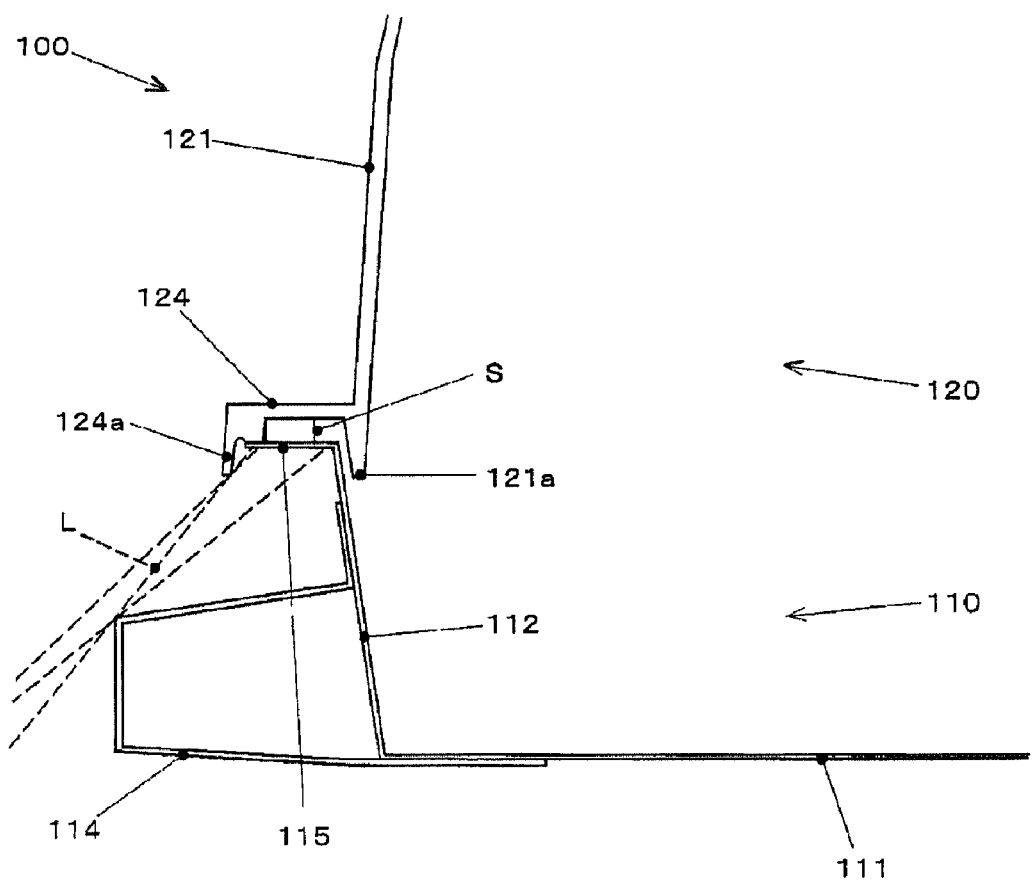
FIG. 10 is an enlarged sectional view of a waterproofing effect of the battery box according to this embodiment.

The end surface portion 124a is provided in an area other than an attachment portion for the clamp 150. As shown in FIG. 10, a lower end portion of the end surface portion 124a is disposed below the flange 115. With this constitution, the end surface portion 124a conceals the gap between the flange 115 and the flange 124. The end surface portion 124a functions as a guard portion according to the present invention for concealing the seal member S in cooperation with the outer peripheral frame 114.

The end surface portion 124b is provided in the attachment portion for the clamp 150. As shown in FIG. 6, a lower end portion of the end surface portion 124b contacts an upper surface portion of the flange 115.

The projections 124c are engaged to the plate 160, and, as shown in FIG. 7 and so on, are formed to project from an upper surface portion of the flange 124 on either side of the attachment location for the clamp 150.

The battery box 100 is fixed to the vehicle 1 using a front stay 130 and a side stay 140.

As shown in FIG. 3, the front stay 130 connects the front end portion of the battery box 100 to the cross member 5.

As shown in FIG. 4, one end portion of the front stay 130 is joined to a lower surface portion of the outer peripheral frame 114 of the battery pan 110 by welding or the like, and the other end portion contacts a lower surface portion of the cross member 5. A welding nut 131 is fixed to the cross-member-5-side end portion of the front stay 130, whereupon the front stay 130 is fastened to the cross member 5 by a bolt B.

In the front end portion of the battery box 100, a lower end portion of the rear surface portion 5c of the cross member 5 is disposed in a position lower than the flange 115 of the battery pan 110. Further, a tip end portion of the outer peripheral frame 114 is provided below the cross member 5 and disposed further toward the vehicle front than the rear surface portion 5c of the cross member 5. In other words, the outer peripheral frame 114 is disposed under a gap between the cross member 5 and the flange 115.

As shown in FIG. 3, the side stay 140 connects a side end portion of the battery box 100 to the side frame 4.

Figure 5:
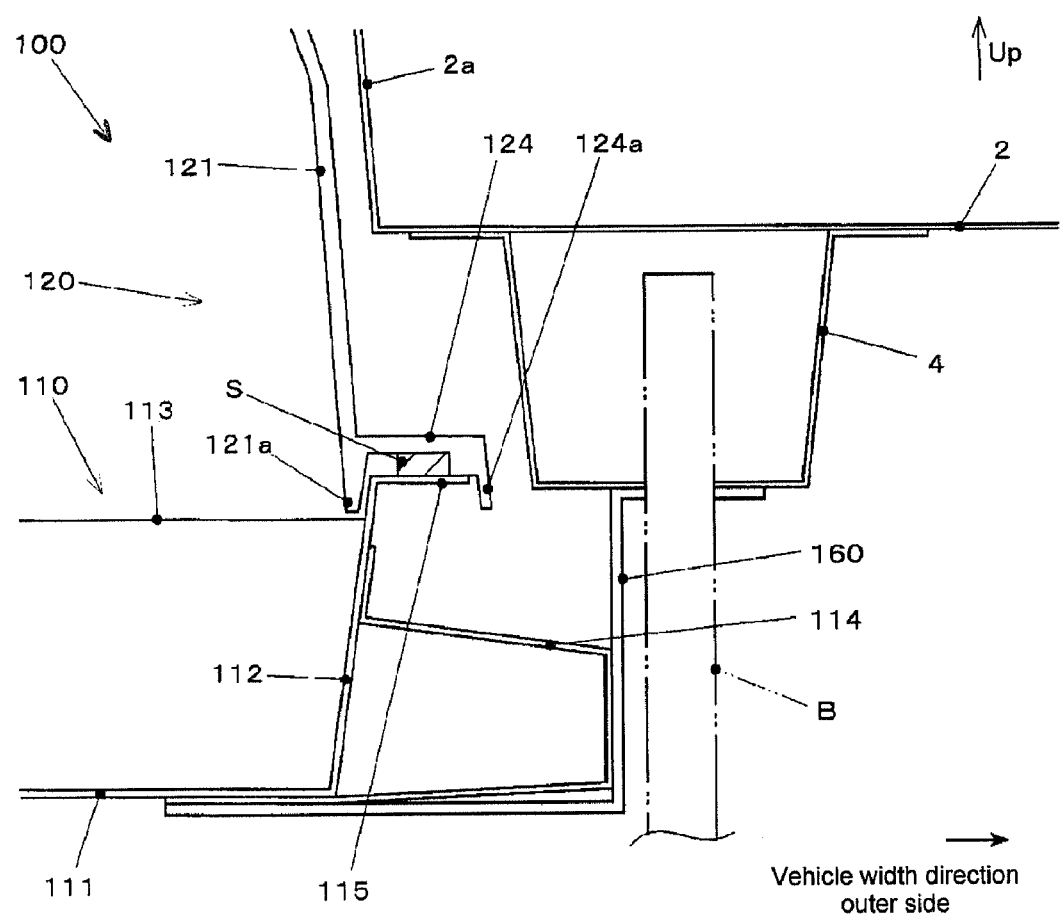
FIG. 5 is a sectional view of the battery mounting structure for a vehicle according to this embodiment, taken along an arrow V-V in FIG. 3.

As shown in FIG. 5, one end portion of the side stay 140 is joined to the lower surface portion of the outer peripheral frame 114 of the battery pan 110 by welding or the like, and the other end portion contacts a lower surface portion of the side frame 4 fixedly.

In the side portion of the battery box 100, the lower surface portion of the side frame 4 is disposed at a substantially identical height to the flange 115 of the battery pan 110. Further, the projecting end portion of the outer peripheral frame 114 is disposed below the side frame 4.

Next, the manner in which the battery pan 110 is fastened to the cover 120 using the clamp 150 and the plate 160 will be described.

As shown in FIG. 6, the clamp 150 includes an upper surface portion 151 for pressing the upper surface portion of the flange 124 on the cover 120, a lower surface portion 152 for pressing the lower surface portion of the flange 115 on the battery pan 110, and a connecting portion 153 for connecting the upper surface portion 151 to the lower surface portion 152, these portions being formed integrally from a plate material possessing elasticity such as spring steel, for example.

To facilitate attachment of the clamp 150, insertion-direction-front-side projecting end portions of the upper surface portion 151 and the lower surface portion 152 are formed with inclined portions inclined upward and downward, respectively.

Figure 9:
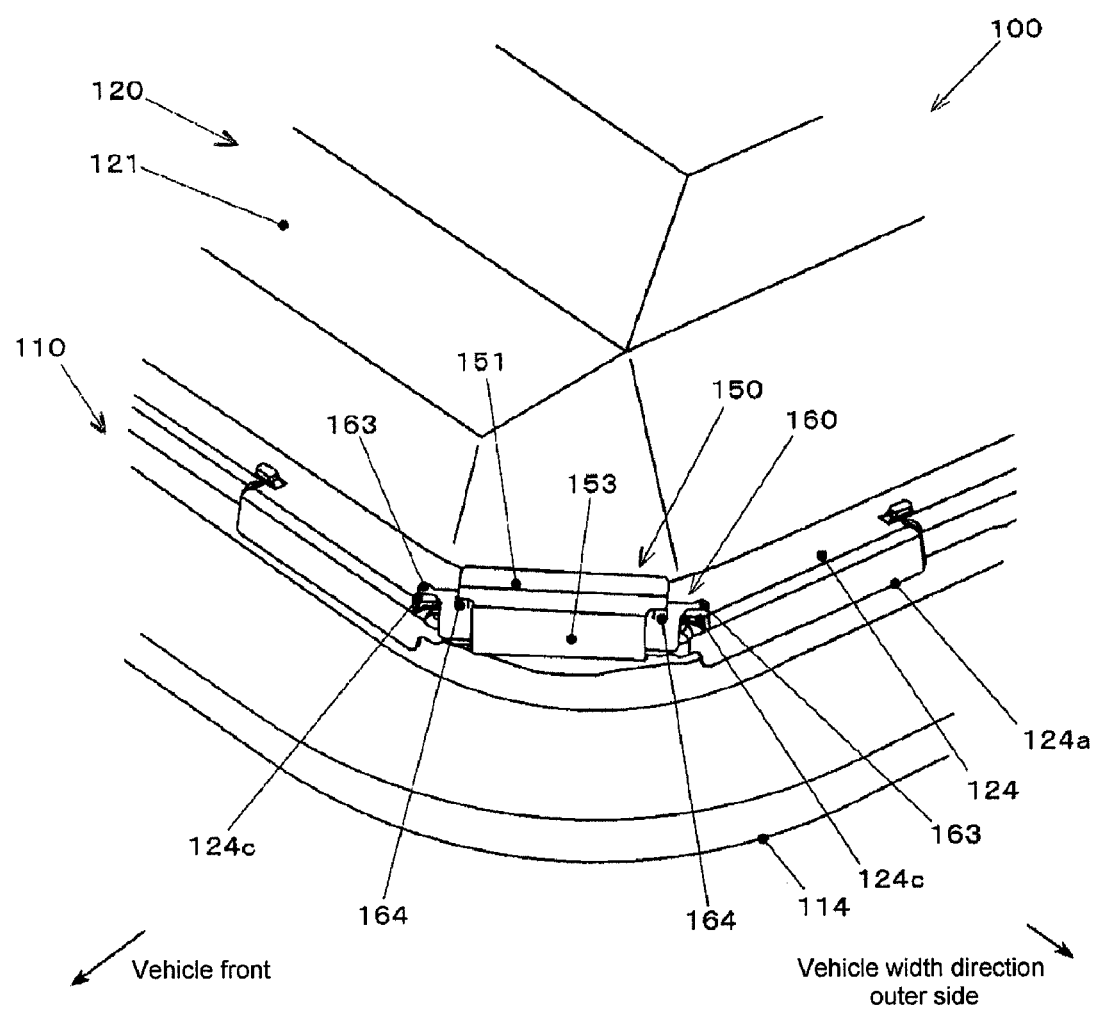
FIG. 9 is a perspective view of the fastening location between the battery pan and the cover of the battery box according to this embodiment when the clamp and the plate are attached thereto such that fastening is complete.

Further, as shown in FIG. 9, the upper surface portion 151 and lower surface portion 152 have a greater width in the horizontal direction (flange lengthwise direction) than the connecting portion 153.

Figure 8:
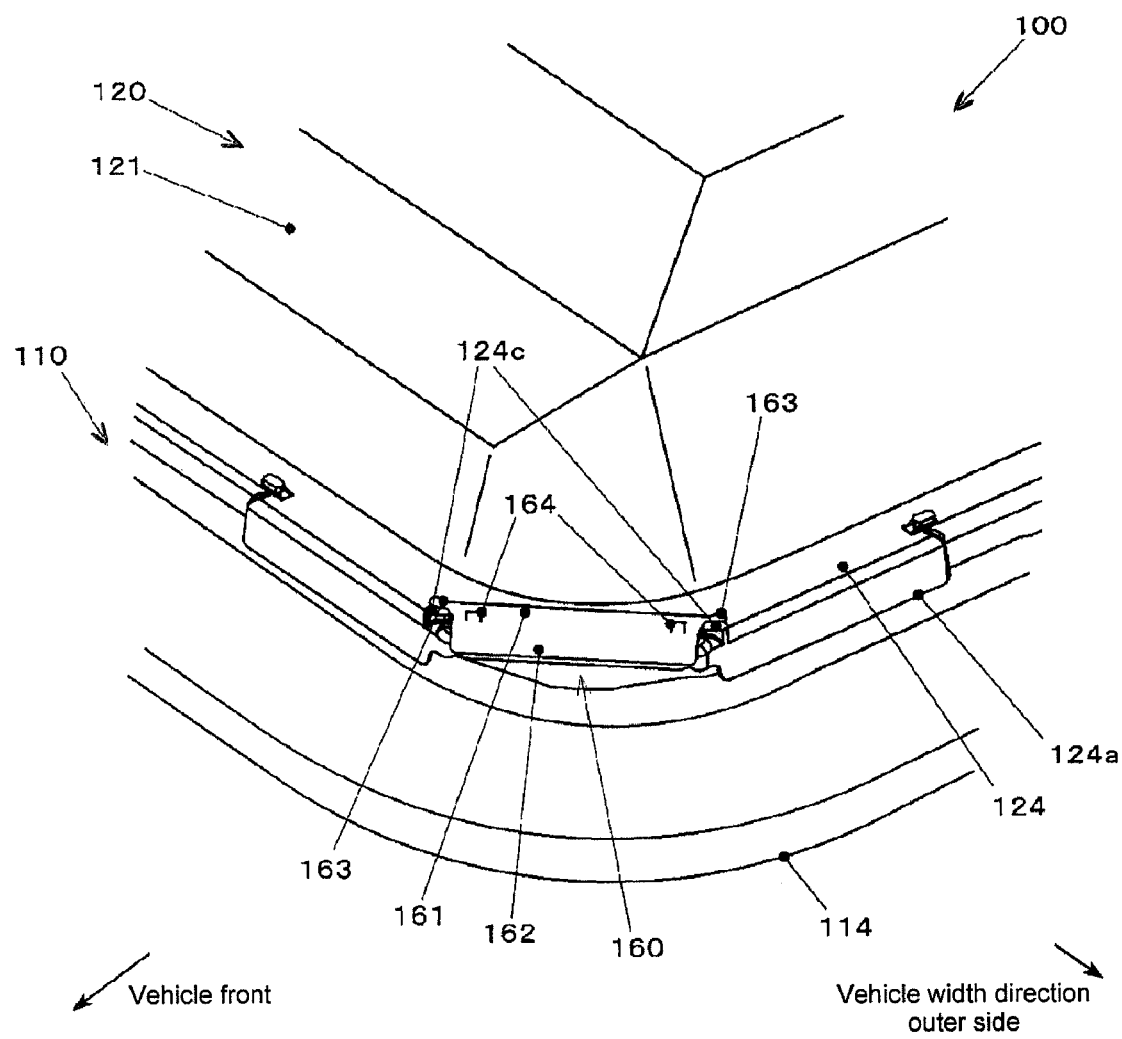
FIG. 8 is a perspective view of the fastening location between the battery pan and the cover of the battery box according to this embodiment when only the plate is attached thereto.

The plate 160 is formed from a thin steel plate, for example. As shown in FIGS. 6, 8 and so on, the plate 160 is constituted by an upper surface portion 161, an end surface portion 162, ear portions 163, pawl portions 164, and so on.

The upper surface portion 161 is a flat plate-shaped part that is sandwiched between the upper surface portion 151 of the clamp 150 and the flange 124.

The end surface portion 162 is formed to project downward from an outer end portion of the upper surface portion 161 and contacts the end surface portion 124b of the flange 124. The ear portions 163 are provided to project from either end portion of the upper surface portion 161, and as shown in FIGS. 6, 8 and so on, the ear portions 163 engage with the projections 124c on the flange 124 in order to position the plate 160.

The pawl portions 164 are cut and raised from the upper surface portion 161, and are formed in an inclined shape such that an end thereof on the side of the front housing portion 121 is higher than an end on the side of the flange 124.

As shown in FIG. 9, the pawl portions 164 engage with respective end portions of the upper surface portion 151 of the clamp 150 to prevent the clamp 150 from dropping off.

In a process for assembling the battery box 100, first, as shown in FIG. 7, the cover 120 is placed on the battery pan 110, and then, as shown in FIG. 8, the plate 160 is placed on the upper portion of the flange 124. At this time, the plate 160 is disposed such that the ear portions 163 engage with the projections 124c of the flange 124.

Next, the clamp 150 is pressed on to fasten the flanges 115 and 124. The clamp 150 flattens the pawl portions 164 while passing over the plate 160, whereupon the pawl portions 164 rise again so as to be pushed into positions for engaging with the upper surface portion 151 of the clamp 150. In this position, the clamp 150 is prevented from dropping off the flanges by the plate 160, and therefore fastening is complete.

As shown in FIG. 3, this structure for fastening the battery pan 110 to the cover 120 using the clamp 150 is dispersed around substantially the entire periphery of the battery box 100. Further, in locations where interference does not occur with vehicle body side members such as the side frames 4, supplemental a fastening structure using the bolt B is employed.

According to the embodiment described above, the following effects can be obtained.

As shown in FIG. 10, in this embodiment, the outer peripheral frame 114 of the battery pan 110 extends around a lower side of the joint portion between the flanges 115 and 124 sandwiching the seal member S, and the end surface portion 124a of the flange 124 projects downward from an outer side of the flange 115. With this constitution, it is impossible for water from the vehicle lower portion to reach the gap between the flanges 115 and 124 on a rectilinear course. More specifically, as shown in FIG. 10, a straight line L linking an upper side edge portion of the outer peripheral frame 114 and a lower side edge portion of the end surface portion 124a of the flange 124 passes through the lower surface portion of the flange 115, and therefore the gap between the flanges 115 and 124 is concealed by the outer peripheral frame 114 and the end surface portion 124a so as to be invisible from the vehicle lower portion.

The side frames 4, cross member 5, front stay 130, rear stay 140, and clamp 150 described above also protect the gap between the flanges 115 and 124 to prevent water from reaching the gap.

Hence, the battery is prevented from being drenched by water that enters the interior of the battery box 100 from a vehicle wheel or a high-pressure car-washing machine, for example.

Further, in an electric automobile in which the battery box 100 is housed under the floor, the battery housing portion 2a must be formed over substantially the entire width of the area between the left and right side frames 4, as shown in FIG. 11A, and therefore, in contrast to a case where a floor tunnel 2b is formed only in the central portion of the floor panel 2, as in an engine vehicle shown in FIG. 11B, it is difficult for the floor panel 2 to transfer a load in the vehicle width direction.

In this embodiment, however, the cross member 113 is provided in the interior of the battery pan 110 and the left and right side frames 4 are connected by the cross member 113 via the outer peripheral frame 114 and the stay 140, and therefore load transfer in the vehicle width direction can be performed efficiently such that rigidity is secured in the vehicle body.

The cross member 5 provided directly in front of the battery box 100 also contributes to load transfer in the vehicle width direction between the left and right side frames 4, thereby improving the rigidity of the vehicle body.

Furthermore, by fastening the battery pan 110 and cover 120 of the battery box 100 using the clamp 150, a projection width of the flanges 115 and 124 can be reduced in comparison with a case where an outer peripheral side of the seal member S is fastened using a bolt or the like, and therefore, when the battery box 100 is housed between the side frames 4, an interior volume of the battery box 100 can be increased due to the reduced width of the flanges.

Further, the clamp 150 can be attached by a simple one-touch pushing operation, and therefore a process for manufacturing the battery box 100 can be simplified. Moreover, by providing the plate 160 for preventing the clamp 150 from dropping off, the clamp 150 can be prevented from becoming dislodged while the vehicle is in use. If the clamp 150 were engaged directly with the projections 124c on the flange 124, it would be necessary to widen the highly rigid clamp 150 in order to pass the clamp 150 over the projections 124c, and as a result, workability would deteriorate due to the need to prepare a dedicated tool, for example. In this embodiment, on the other hand, the plate 160 that engages respectively with the flange 124 and the clamp 150 is used, and therefore the clamp 150 can be attached using a small amount of force, i.e. without impairing workability. In addition, the clamp 150 can be prevented from dropping off.

The present invention is not limited to the embodiment described above, and may be subjected to various amendments and modifications within the technical scope of the present invention.

For example, the specific constitutions of the vehicle body, battery box, and fastening structure may be modified appropriately. For example, the vehicle according to the above embodiment is a small electric vehicle, but the present invention may also be applied to a medium or large vehicle, an engine-electric hybrid vehicle, a fuel cell vehicle, and so on.

What is claimed is:

1. A battery mounting structure for a vehicle, which includes a battery box that is mounted on an under-floor side of a vehicle body floor, wherein said battery box has:
   a battery pan on which a battery is placed and having an outer peripheral edge portion;
   a wall disposed on the outer peripheral edge portion and positioned approximately perpendicular to said battery pan;
   an outer peripheral frame formed to project from said outer peripheral edge portion of said battery pan and projecting approximately horizontally from a lower portion of said wall;
   a cover placed on said battery pan from above;
   a joint portion disposed between said battery pan and said cover, projecting approximately horizontally from an upper portion of said wall being disposed above said outer peripheral frame and positioned further inside than an outer periphery of said outer peripheral frame in plan view; and
   a seal disposed solely on said joint portion and engaged by said cover.

2. The battery mounting structure for a vehicle according to claim 1, wherein a guard portion for concealing said seal from the outside of the vehicle in cooperation with said outer peripheral frame is formed on an outer peripheral edge portion of at least one of said cover and said battery pan.

3. The battery mounting structure for a vehicle according to claim 1, wherein said seal in a front end portion of said battery box is disposed on a rear side of a cross member that is provided on said vehicle body so as to extend in a vehicle width direction, and a part of said outer peripheral frame is disposed under a gap between said cross member and said seal.

4. The battery mounting structure for a vehicle according to claim 3, comprising a stay for connecting said front end portion of said battery box to said cross member.

5. The battery mounting structure for a vehicle according to claim 1, wherein said seal comprises:
   a seal member formed from an elastic material; and
   a cover side flange opposing said joint portion, with said seal interposed therebetween, and further comprises:
   a clamp that sandwiches said battery pan side flange and said cover side flange using a spring force; and
   a dropping-off prevention plate which is provided between an upper surface of said cover side flange and said clamp, and which engages respectively with said cover side flange and said clamp to prevent said clamp from dropping off.

6. The battery mounting structure for a vehicle according to claim 1, wherein said outer peripheral frame is provided around an entire periphery of the outer peripheral edge portion.

7. The battery mounting structure for a vehicle according to claim 1, wherein said cover further comprises a cover side flange opposing said joint portion, said cover side flange comprises:
   a first end portion depending from said cover side flange further than said joint portion toward said lower portion of said wall.

8. The battery mounting structure for a vehicle according to claim 7, wherein said cover side flange further comprises:
   a second end portion opposite said first end portion and contacts said joint portion.

* * * * *